United States Patent [19]

Macfee

[11] 4,115,489
[45] Sep. 19, 1978

[54] PLASTICIZING AND MOLDING ARTICLES FROM POLYMER STRIP

[75] Inventor: Norman W. Macfee, Conneaut Lake, Pa.

[73] Assignee: Textron, Inc., Providence, R.I.

[21] Appl. No.: 809,842

[22] Filed: Jun. 24, 1977

[51] Int. Cl.² .................. B29D 5/00; B29C 5/00; B29C 11/00

[52] U.S. Cl. .................. 264/23; 156/73.2; 156/245; 264/248; 264/320; 425/814

[58] Field of Search .............. 156/73.1, 73.2, 245; 264/23, 248, 259, 271, 320; 425/174.2, 517, 814

[56] References Cited

U.S. PATENT DOCUMENTS

| | | | |
|---|---|---|---|
| 3,672,008 | 6/1972 | Moertel et al. | 24/205.11 F |
| 3,775,815 | 12/1973 | Johnston et al. | 24/205.11 F |
| 3,951,715 | 2/1975 | Hofius | 156/73.1 |
| 4,026,974 | 5/1977 | Moertel et al. | 264/23 |

Primary Examiner—Willard E. Hoag
Attorney, Agent, or Firm—O'Brien and Marks

[57] ABSTRACT

Successive portions of a continuous polymer filament are plasticized such as by localized heating with ultrasonic or thermal energy, and the plasticized portions are molded in one or more cavities to form articles such as slide fastener elements. Additionally there is disclosed the attachment of a thermoplastic slide fastener coupling element to the edge of a tape by surrounding the leg portions with walls of cavities in a pair of ultrasonic members and applying ultrasonic energy through energy directing projections located centrally within the cavities to the pair of legs to fuse the legs to the edge of the tape.

10 Claims, 31 Drawing Figures

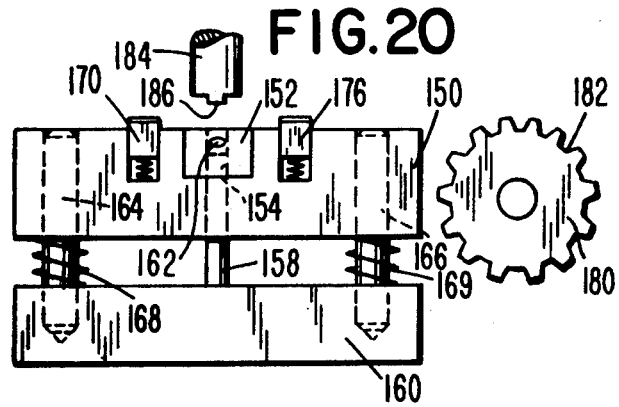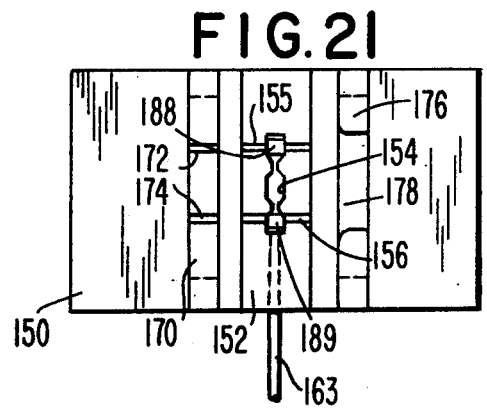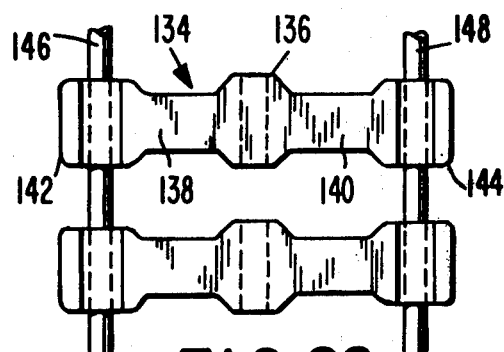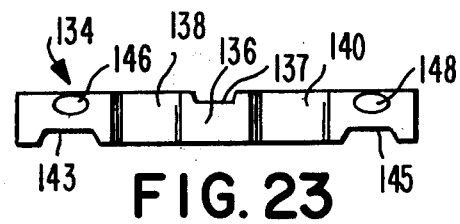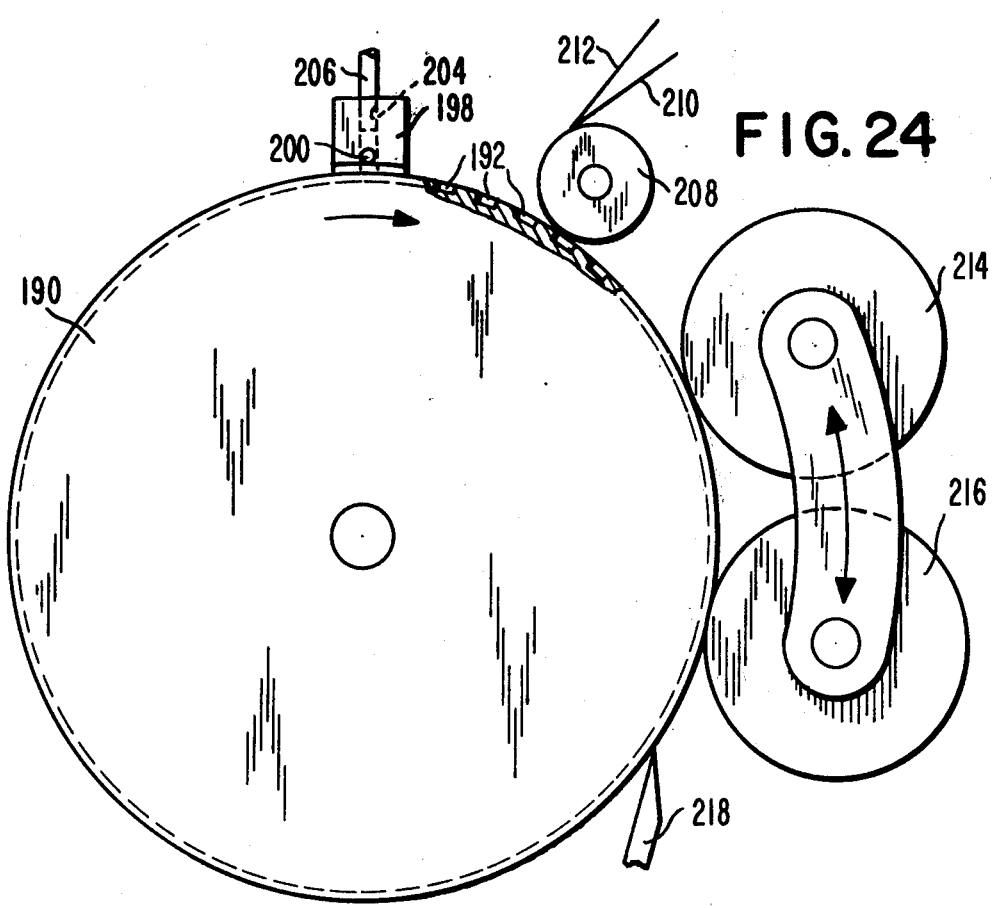

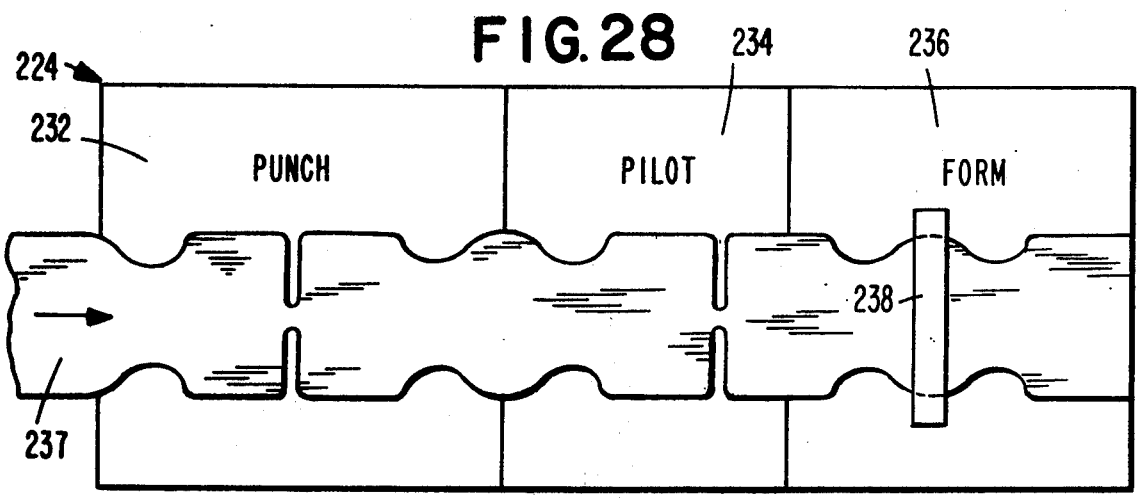
FIG. 28
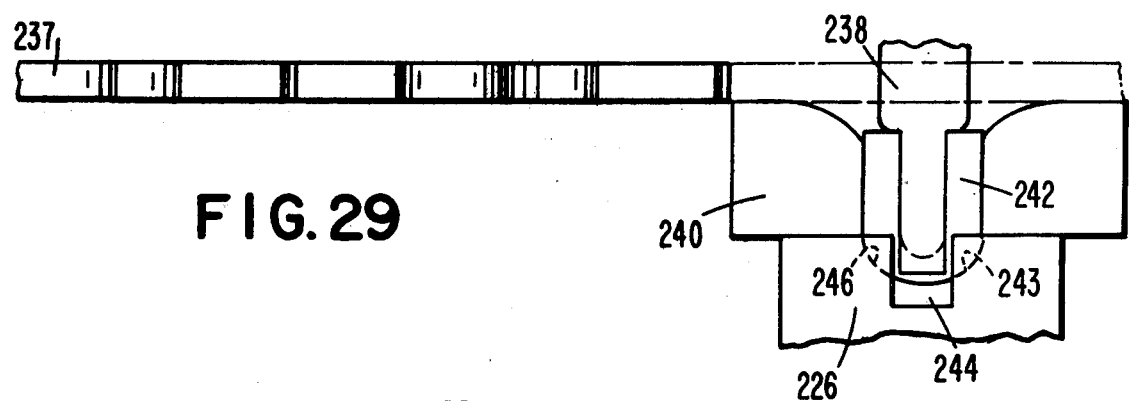
FIG. 29
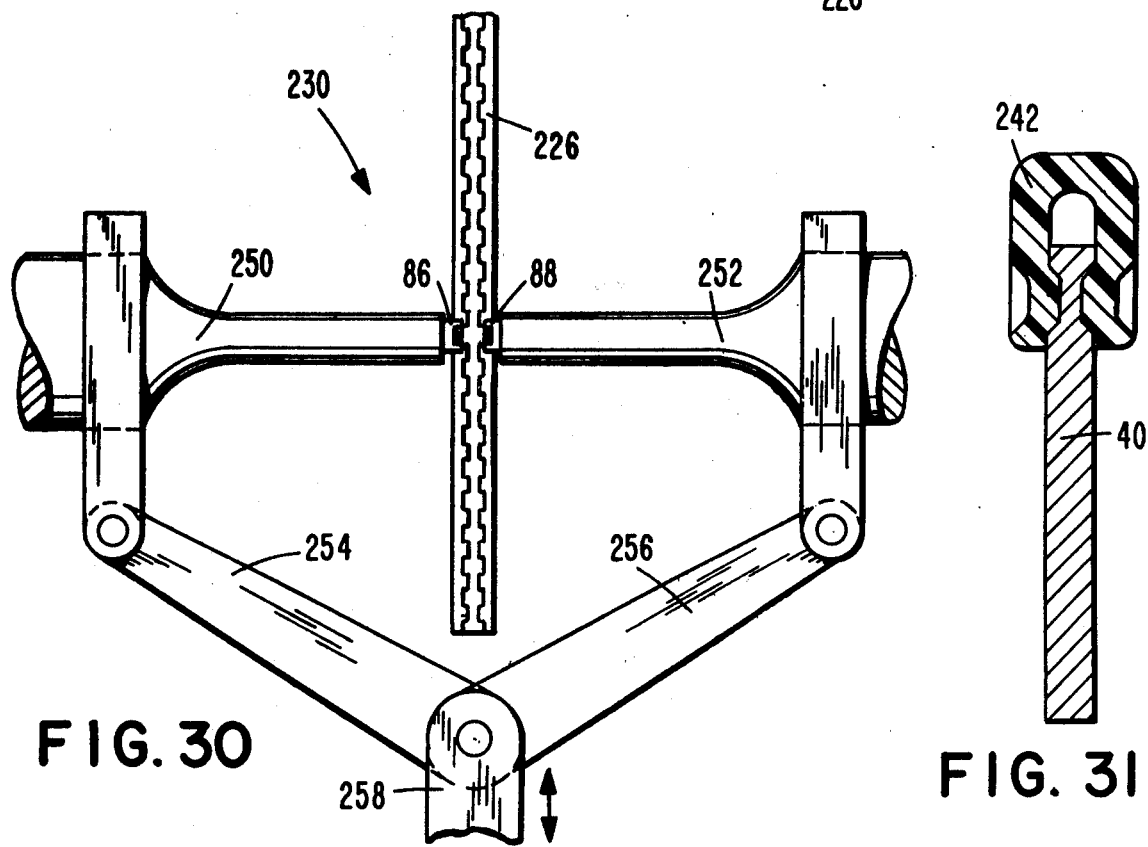
FIG. 30
FIG. 31

PLASTICIZING AND MOLDING ARTICLES FROM POLYMER STRIP

BACKGROUND OF THE INVENTION

1. Field of the Invention

This invention relates to the manufacture of articles such as slide fasteners, and particularly to the manufacture of small polymer articles such as coupling elements for slide fasteners and their attachment to a support tape.

2. Description of the Prior Art

The prior art contains many methods and apparatus for manufacturing small articles such as slide fastener coupling elements including the manufacture of coupling elements from polymer resin and the attachment of such elements to support tapes.

In one method and apparatus, coupling elements are formed by injection molding or casting in cavities from a molten supply of thermoplastic. These cast elements may be molded directly on the edge of a tape, molded on connecting filaments to form trains which are subsequently attached to an edge of the tape by sewing or weaving, or molded individually and then subsequently crimped on the edge of a tape or subsequently crimped on a carrier filament and then attached to a tape.

Another method and apparatus for manufacturing coupling elements and slide fasteners includes forming spiraled or convoluted continuous polymer filaments which are configured to interlock with mating coupling elements. These continuous filament coupling elements may be made by coiling or convoluting a continuous straight filament, or the filament of convoluted form may be cut from a continuous plastic sheet. It is known to heat the plastic to help in the formation of the convolutions and deformations necessary to form filamentary type coupling elements.

Still another method and apparatus utilizes the coining or deformation of elements from plastic or metal filaments and the cutting of segments either before or after the coining and deforming to form individual elements. These elements may be sewn or attached by crimping to the edge of a tape or cord.

The use of ultrasonic energy to weld leg portions of continuous filament type coupling elements together or to the edge of a tape has been disclosed in the prior art. Also ultrasonic energy has been utilized for fusing coupling elements together to form bottom stops on slide fasteners as well as to simultaneously cut a continuous slide fastener chain into segments to form individual slide fasteners. Further slide fastener tapes have been channelized by ultrasonic energy. Ultrasonic energy has also been used to plasticize and mold top stops from severed portions of filamentary material onto tapes and top elements of slide fasteners.

SUMMARY OF THE INVENTION

The invention is summarized in a method of manufacturing coupling elements for a slide fastener including the steps of advancing a continuous filament of thermoplastic, sequentially plasticizing successive portions of the filament, and molding the plasticized successive portions in cavity means to at least partially form coupling elements.

An object of the invention is to provide substantially new and improved techniques for producing and/or attaching small polymer articles such as coupling elements for slide fasteners.

Another object of the invention is to produce closer dimensional control of elements employed in slide fasteners.

It is still another object of the invention to reduce or eliminate the production of flash and the necessity of skiving operations to remove excessive plastic in the formation of coupling elements.

A further object of the invention is higher productivity in the manufacture of slide fastener elements.

Other objects, advantages, and features of the invention will be apparent from the following description of the preferred embodiment taken in conjunction with the accompanying drawings.

BRIEF DESCRIPTION OF THE DRAWINGS

FIG. 20 is an elevation view of an assembly for manufacturing slide fastener elements in accordance with another modification of the invention.

FIG. 21 is a plan view of the apparatus of FIG. 20.

FIG. 22 is a bottom plan view of a train of elements manufactured in the apparatus of FIGS. 20 and 21.

FIG. 23 is a front elevation view of the elements of FIG. 22.

FIG. 24 is a front elevation view of another modified apparatus for manufacturing slide fastener elements in accordance with the invention.

FIG. 28 is a plan view of the filament of FIG. 27 being formed into an element in the apparatus of FIG. 26.

FIG. 29 is a side view of the filament of FIG. 28.

FIG. 30 is a side elevation view of a mechanism for attaching elements to a tape in the apparatus in FIG. 26.

FIG. 31 is a cross section view of an element attached to a tape in accordance with FIG. 30.

DESCRIPTION OF THE PREFERRED EMBODIMENT

Figure 1:
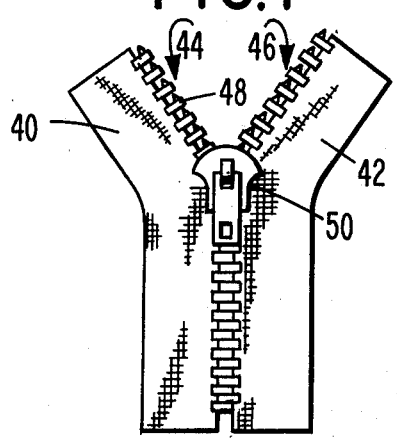
FIG. 1 is a plan view of a slide fastener constructed in accordance with the invention.

As illustrated in FIG. 1, a slide fastener manufactured in accordance with the invention includes a pair of tapes 40 and 42 having respective rows, indicated generally at 44 and 46, of fastening elements 48 attached to inner edges of the tapes 40 and 42. A slider 50 is slidably mounted on the rows 44 and 46 of fastening elements for opening and closing the slide fastener.

Figure 4:
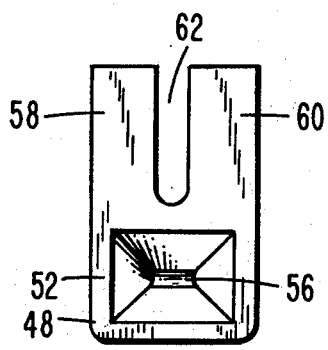
FIG. 4 is a rear view of a slide fastener coupling element made in accordance with FIGS. 2 and 3.
Figure 5:
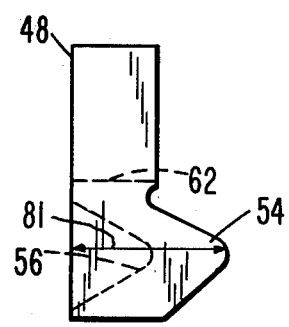
FIG. 5 is a side view of the element of FIG. 4.
Figure 6:
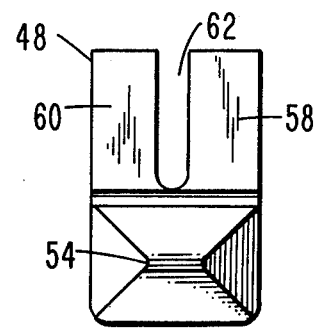
FIG. 6 is a front view of the element of FIG. 4.

The fastening elements 48 as illustrated in FIGS. 4, 5 and 6 each include a head portion 52 having a projection 54 in the front thereof and a recess or pocket 56 in the rear thereof for interlocking with mating elements in a conventional manner. A pair of parallel legs 58 and 60 extend in the same direction from the head 52 and define a slot 62 therebetween for receiving the support tape 40 or 42.

Figure 7:
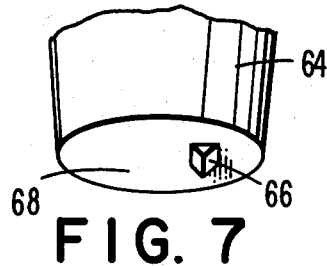
FIG. 7 is a perspective view of an ultrasonic horn tip used in the manufacture in accordance with FIGS. 2 and 3.
Figure 8:
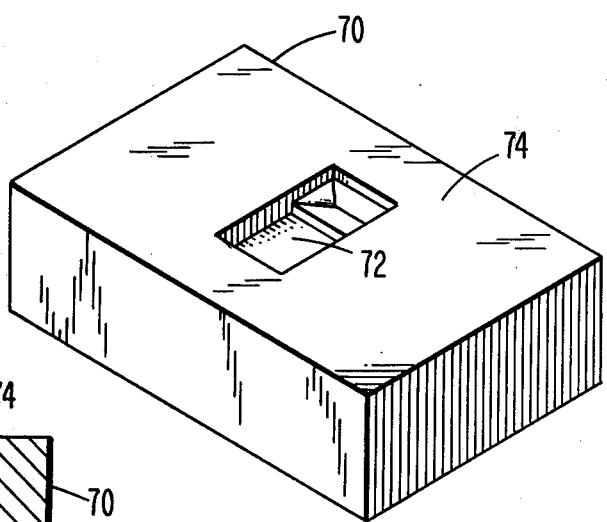
FIG. 8 is a perspective view of an anvil used in the manufacture in accordance with FIGS. 2 and 3.
Figure 9:
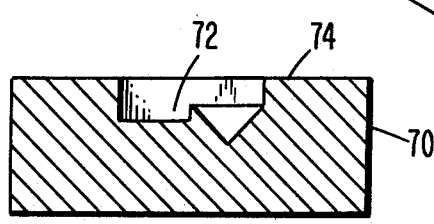
FIG. 9 is a cross-sectional view of the anvil of FIG. 8.

An ultrasonic horn tip 64 is illustrated in FIG. 7 and includes a projection 66 on a flat face 68 thereof and having a configuration of a suitable size and shape for forming the pockets 56 in the elements 48. An anvil 70, illustrated in FIGS. 8 and 9, has a cavity 72 recessed in an upper flat surface 74 of the anvil 70 with the configuration of the cavity 72 conforming to the front portion of the element 48 except for the slot 62.

Figure 2:
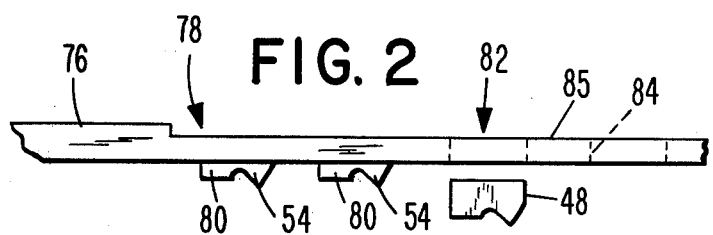
FIG. 2 is a side elevation view of a thermoplastic filament being processed to form coupling elements in accordance with the invention.
Figure 3:
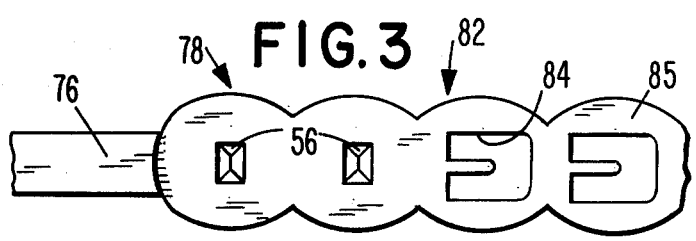
FIG. 3 is a top view of the filament of FIG. 2.

In the manufacture of the elements 48 as illustrated in FIGS. 2 and 3, a strip or filament 76 of thermoplastic is intermittently advanced between the ultrasonic horn tip 64 and anvil 70 and the ultrasonic horn tip is energized with ultrasonic energy and lowered to engage and plasticize small localized portions or short segments sequentially at a first station indicated generally at 78. After plasticizing, a portion 80 of the plasticized material is molded or forced into the cavity 72. The spacing between the tip 64 and anvil 70 and the depth of the cavity 72 are selected so that they form the total thickness 81, FIG. 5, of the element 48 in a flattened and spread out portion of the strip. Subsequently at a station indicated generally at 82 the element 48 is stamped or punched by a conventional punch and die (not shown) from the flattened portion of the strip 76 leaving an excess portion 85 of the strip surrounding the area from which the element was punched. The punch and die have the outline of the element 48 as illustrated by the cutout 84 in the strip 76.

The utilization of an advancing continuous strip 76 of thermoplastic with localized plasticizing at the station 78 and molding a portion of the plasticized material into the die cavity 72 and with subsequent separation or punching of the element 48 from the strip 76 produces a slide fastener element with a minimum of steps. Extrusion apparatus is not necessary as with conventional molded thermoplastic fastener elements. Further the elements have dimensions determined solely by the tip 64, the mold cavity 72 and the punch and die as opposed to elements which are coined or stamped and have variations in their dimensions depending upon the parameters of the filament or wire being stamped. The most critical portions namely the projection 54 and the pocket 56 of the element 48 are formed by the molding in the die cavity 72 and around the projection 66 and thus the critical parameters of the elements 48 are carefully controlled.

Figure 10:
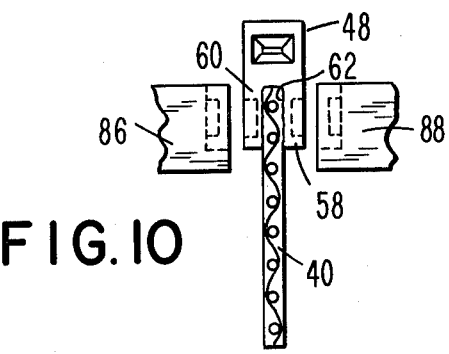
FIG. 10 is a cross-sectional view illustrating the attachment of the element of FIG. 4 to a tape in accordance with the invention.
Figure 11:
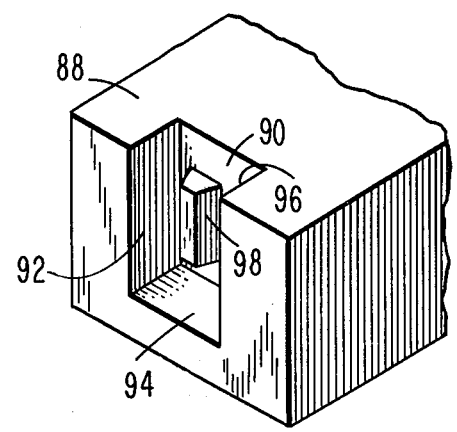
FIG. 11 is a perspective view of an ultrasonic horn tip used in the attachment of the element in FIG. 10.
Figure 12:
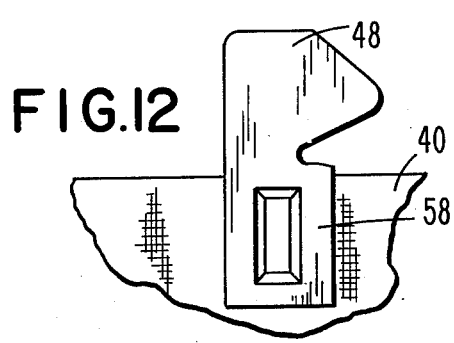
FIG. 12 is a side view of the attached element of FIG. 10.
Figure 13:
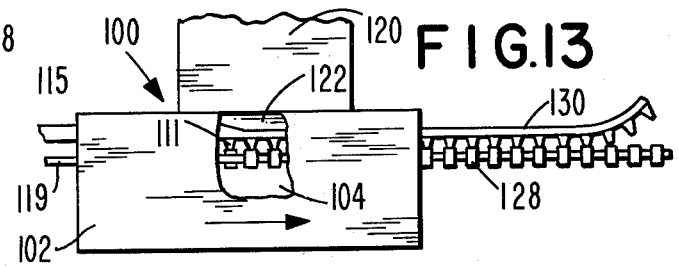
FIG. 13 is a side view of an assembly with a portion broken away for manufacturing elements in a modification of the invention.
Figure 14:
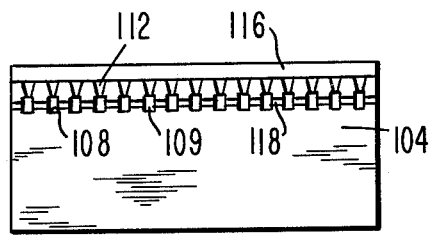
FIG. 14 is a side view of one half of a cavity block used in the assembly of FIG. 13.
Figure 15:
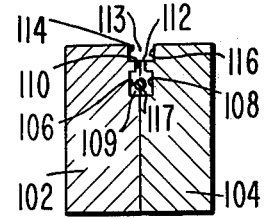
FIG. 15 is a cross section view of both halves of the cavity block in the assembly of FIG. 13.
Figure 16:
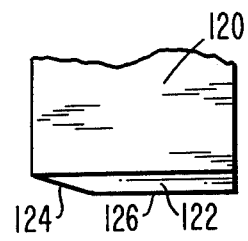
FIG. 16 is a side view of the tip of an ultrasonic horn used in the assembly of FIG. 13.
Figure 17:
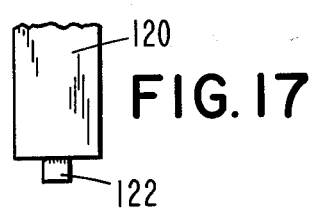
FIG. 17 is a front view of the ultrasonic horn tip of FIG. 16.

In attaching the elements 48 to the tapes 40 and 42, as shown for the tape 40 in FIGS. 10 and 12, the elements 48 are placed on one edge of the tape with the edge of the tape received in the slot 62 between the legs 58 and 60. The opposite legs 58 and 60 are engaged by respective members or tips 86 and 88 of ultrasonic vibration mechanism. Each of the tips, as illustrated for the tip 88 in FIG. 11 has a cavity 90 therein with walls 92, 94, and 96 bordering three sides of the cavity 90 with the top side being open to receive and surround the respective leg portions 58 and 60. An energy directing member or projection 98 is positioned centrally within the cavity 90 for engaging the leg portions 58 and 60 and transmitting the ultrasonic energy to the central portion to the legs 58 and 60. This direction of the energy to the central portion of the legs 58 and 60 provides a more efficient heating of the legs 58 and 60 and a better bond between the legs 58 and 60 and the tape 40. Further the walls 92, 94 and 96 surrounding the leg portions 58 and 60 in the areas where they are subject to flattening and distortion from the application of ultrasonic energy maintains the shapes of the legs 58 and 60.

As shown in FIGS. 13, 14, 15, 16, and 17 a modified apparatus for manufacturing the coupling elements for a slide fastener includes an assembly indicated generally at 100 with a pair of die blocks or mold halves 102 and 104 having cavity halves 106 and 108 forming mold cavities 109 for forming elements. Mating grooves 110 and 112 in the respective mold halves 102 or 104 form input gates 111 to the mold cavities 109 from a channel 113 defined by grooves 114 and 116 in the respective mold halves 102 and 104 for receiving a thermoplastic strip or filament 115. Additionally the die blocks 102 and 104 have respective half-round grooves 117 and 118 for receiving and holding a cord 119 through the center of the cavities 109. An ultrasonic horn tip 120 has a horizontal ridge 122 across the bottom thereof with a leading edge 124 of the ridge 122 formed at an acute angle with respect to the bottom for engaging the strip or filament 115 in the channel 113. The ridge 122 is designed to plasticize and force a substantial portion of the filament 115 through the gates 111 into the cavities 109.

In operation of the molding assembly 100, the mold die blocks 102 and 104 are closed with the cord 119 held in the passageway formed by grooves 117 and 188 and with the thermoplastic filament 115 extending in the entire length of the channel 113. The closed die blocks 102 and 104 are moved to the right as viewed in FIG. 13 with the ridge 122 of the ultrasonic mechanism 120 extending into the channel 113 beginning at the right end thereof. The vibration of the horn 120 plasticizes the material 115 and the advancement along the acute edge 124 and bottom surface 126 of the ridge 122 forces the plasticized material through the gates 111 into the cavities 109 around the cord 119 to form a train of coupling elements 128. Subsequently the cavity blocks 102 and 104 are opened and the product removed. The die blocks 102 and 104 are advanced for another cycle. The runner 130 formed in the channel 113 is severed from the coupling elements 128. The train of coupling elements 128 may then be attached to a tape such as by weaving or sewing.

Utilizing the ultrasonic energy to plasticize a section or portion of the filament 115 and then forcing the plasticized portion through the gate passages 111 into the cavities 109 eliminates the necessity of expensive conventional injection molding apparatus and the like.

Figure 19:
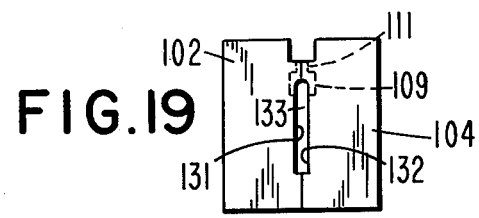
FIG. 19 is a front view of a cavity block used in the assembly of FIG. 18.
Figure 18:
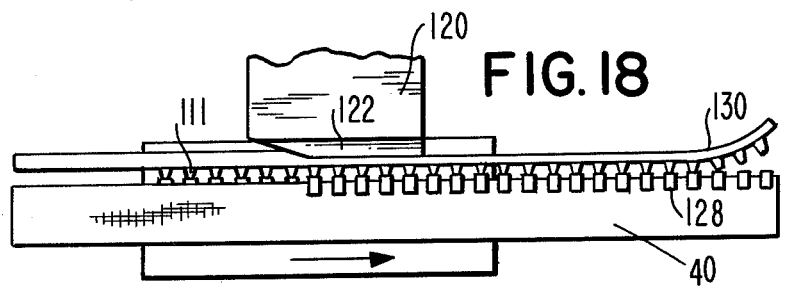
FIG. 18 is a side cross-sectional view of a variation of the assembly of FIG. 13 taken between the cavity block halves for manufacturing a slide fastener stringer in accordance with the invention.

A variation of the molding dies 102 and 104 with ultrasonic plasticizing and injection or molding through input passages 111 into enclosed cavities 109 is shown in FIGS. 18 and 19. In this variation wide mating grooves 131 and 132 are formed in the respective mold halves 102 and 104 for forming a passage 133 to receive the tape 40. Thus the elements 128 are molded directly on the edge of the tape 40.

A third modification is shown in FIGS. 20 and 21 for forming a continuous train of elongated coupling elements indicated generally at 134 in FIGS. 22 and 23. Each of the elements 134 has a widened head 136 and a pair of legs 138 and 140 extending in opposite directions from opposite sides of the head 136. The legs 138 and 140 terminate in respective widened heel portions 142 and 144 which are molded around respective connecting threads 146 and 148.

The apparatus of FIGS. 20 and 21 includes a base 150 with a die cavity insert 152 having a vertical opening or cavity 154 with an elongated horizontal cross section corresponding to the slide fastener element 134 as shown in FIG. 22. Additionally grooves 155 and 156 extend across the insert 152 intersecting respective opposite ends of the cavity 154 for receiving the connecting threads 146 and 148. A punch 158 having a horizontal configuration mating with the cavity 152 is mounted on a support 160 with its upper end extending into the cavity 154. A filament feeding passageway 162 extends horizontally from one side of the insert 152 into one end of the cavity 154 for guiding a filament 163 of thermoplastic into the cavity 154 above the punch 158. The base 150 is mounted on the support 160 by suitable guides 164 and 166 with springs 168 and 169 normally holding the base 150 in a raised position. On the top surface of the base 150 a guide 170 is spring biased to a raised position and includes guide channels 172 and 174 for the connecting threads 146 and 148. Another guide 176 mounted on the opposite side of the insert 152 is similarly spring biased to a raised position and has a channel 178 formed therein for passing the elements 134 after they are molded. An index wheel 180 has notches 182 for receiving the elements 134 and advancing the elements 134 from the molding apparatus. An ultrasonic horn tip 184 is disposed over the top of the die insert 152 for moving down into engagement with the member 152. The ultrasonic horn tip 184 has a projection 186 for forming a channel 137 across the head 136 of the element 134 while the punch 167 has projections 188 and 189 for forming channels 143 and 145 across the respective heels of the element 134.

In operation of the apparatus of FIGS. 20 and 21 to form the train of slide fastener elements 134 in FIGS. 22 and 23, the connecting threads 146 and 148 are fed over the guide 170 into the grooves 155 and 156. The filament 163 of thermoplastic is advanced through the passageway 162 to extend through the horizontal length of the cavity 154. The ultrasonic horn 184 is moved down into engagement with the top of the member 150 causing the die member to move downward and the punch 158 to sever a section of the filament 163 in the cavity 154. Continued movement causes the punch 158 to move upward and engage the severed section of filament with the bottom of the ultrasonic horn 184. Application of ultrasonic energy plasticizes the severed segment of filament in the die cavity 154 molding the plasticized material to the shape of the cavity 154 and around the connecting threads 146 and 148 to form the coupling element 134. The projections 186, 188 and 189 increase the amount of energy applied to the head 136 and heels 142 and 144 to insure accurate molding of the head 136 in the cavity 154 and to insure complete molding around the threads 146 and 148. Thereafter the ultrasonic horn is released and the element is moved upward under the force of the spring biased guides 170 and 176 from the cavity and the wheel 180 is advanced to position the threads 146 and 148 for a subsequent molding step. The train of coupling elements 134 are later folded into a U-shape and attached to a tape in a conventional manner.

Figure 25:
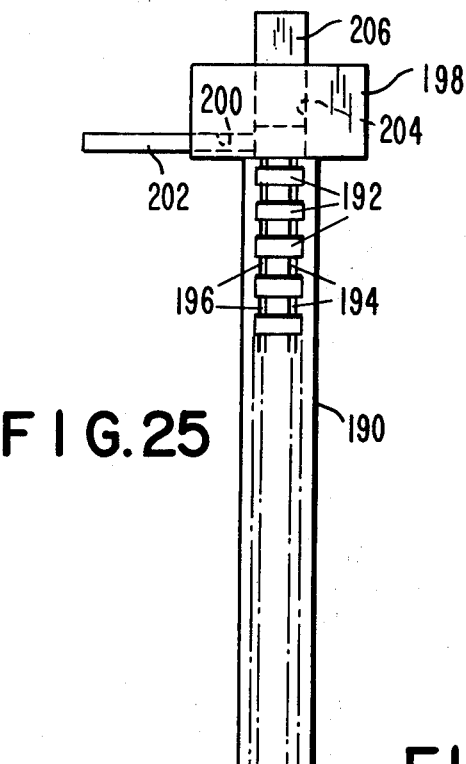
FIG. 25 is a side view of a portion of the apparatus of FIG. 24.
Figure 27:
FIG. 27 is a cross section view of a filament used in the manufacture of elements in the apparatus of FIG. 26.
Figure 26:
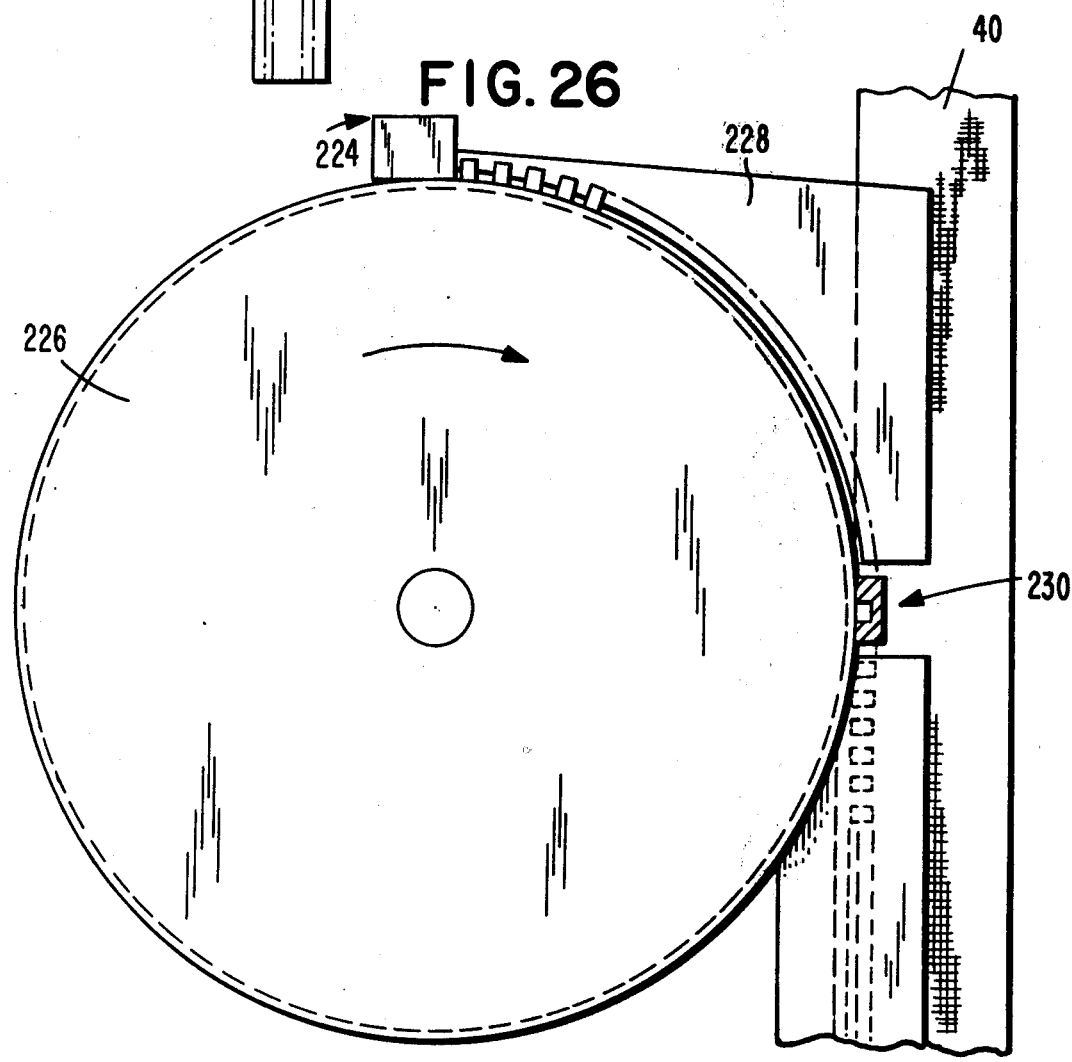
FIG. 26 is a front view of still another modification of the apparatus for manufacturing a slide fastener in accordance with the invention.

A fourth modification shown in FIGS. 24 and 25 includes a cavity wheel 190 having a row of elongated cavities 192 circumferentially therearound and extending parallel the axis of rotation of the cavity wheel 190 with a pair of grooves 194 and 196 extending around the periphery of the cavity wheel and intersecting the ends of the cavities 192. On the top of the cavity wheel is supported a punch and die arrangement including a die 198 having a passageway 200 for directing a thermoplastic filament 202 into a vertical passageway 204 into which a mating punch 206 extends for severing a segment of the filament 202. The cavity 204 is aligned over the row of cavities 192 in the cavity wheel 190 so as to direct severed segments or portions of the filament 202 into the cavities 192. The cavity wheel 190 is heated by conventional heating means to heat the severed segments to a plasticizing temperature to soften the severed segments. Located angularly beyond the punch 206 in the direction of rotation of the wheel 190 is a guide roll 208 for directing connecting threads 210 and 212 into the grooves 194 and 196 and for pressing the threads 210 and 212 into the softened material. Thereafter rolls 214 and 216 are suitably mounted for reciprocating angular movement about a segment of the forming wheel 190 and for engaging the outer periphery of wheel 190 to swage and knead the softened thermoplastic segments within the cavities 192 to the shape of the cavities. After the swaging rolls 214 and 216, a cutting knife 218 is positioned to remove any flash produced by the swaging.

In operation of the apparatus of FIGS. 24 and 25, the filament 202 is advanced into the passageway 204 a predetermined amount. The punch 206 is lowered to sever the controlled segment in the cavity 204 and to position the severed segment into a cavity 192. The wheel 190 is indexed during the upstroke of the punch 206. The severed segment is heated by the wheel 190 and the connecting threads 210 and 212 are laid in the grooves 194 and 196 and are pressed into the softened segments by the roll 208. Thereafter the thermoplastic segments are kneaded and molded in the cavities 192 by the rolls 214 and 216. Also the threads 210 and 212 are further pressed into the thermoplastic material by the swaging rolls 214 and 216. By controlling the volume of the severed segment of thermoplastic filament, the amount of flash is kept to a minimum.

In a fifth modification of the invention as illustrated in FIGS. 26–30, there is included an element forming station indicated generally at 224, a setting wheel 226 which runs adjacent the element forming station, an element and tape guide 228 extending about 90° around the periphery of the setting wheel 226 from the forming station, and an ultrasonic element fusing station indicated generally at 230. At the element forming station 224 as shown in FIG. 28, there is included a punch 232, a conventional pilot or guide section 234 and a bending or forming section 236. The punch 232 is a convention punch designed to form the outline of the elements as illustrated from a flat strip 237, FIGS. 27, 28 and 29, of thermoplastic material. The forming section 236 includes a forming punch 238, FIG. 29, together with a die 240 shaped so that when the punch 240 is advanced an element 242 is bent and forced downward into the die 240 and into a seat formed by notches 246 and 248 on opposite sides of a channel 244 around the periphery of the wheel 226.

At the ultrasonic fusing station 230 as shown in FIG. 30, a pair of ultrasonic mechanisms 250 and 252 are mounted for movement on opposite sides of the setting wheel 226 in a line toward and away from the setting wheel 226. Means such as links 254 and 256 are pivotally mounted on the ultrasonic mechanisms 250 and 252 at one ends thereof, respectively, and are mounted at their other ends at a common point on a moving member 258 for advancing the ultrasonic mechanisms 250 and 252 into engagement with the leg portions of the elements 242 in time relationship to operation or indexing of the setting wheel 226 and the punching mechanism 232. In particular the setting wheel is advanced on the upstroke of the punch and forming mechanism 224 while the ultrasonic units are brought into engagement with the elements 242 during the downstroke of the punch and forming mechanism. The ultrasonic mechanisms 250 and 252 contain the same ultrasonic horn tips 86 and 88 as previously described to bond the elements 242 to the tape 40 as shown in FIG. 31.

Since the invention is subject to many modifications, variations, and changes in detail, it is intended that all matter in the foregoing description and shown in the accompanying drawings be interpreted as illustrative and not in a limiting sense.

What is claimed is:

1. In a method of manufacturing coupling elements for a slide fastener, the steps comprising:

advancing a continuous filament of thermoplastic, sequentially plasticizing unsevered successive portions of the filament, and molding the plasticized successive portions in cavity means to at least partially form coupling elements.

2. A method as claimed in claim 1 wherein the molding is performed by forcing only a portion of the plasticized thermoplastic portion into a cavity on one side of the strip, and forming a pocket on the other side of the strip, and further including the step of punching the element from the tape.

3. A method as claimed in claim 2 wherein the molding includes flattening the plasticized portion, and the punching includes leaving the flattened portion surrounding the area from which the element is punched.

4. A method as claimed in claim 1 wherein the molding includes forcing at least a portion of each plasticized portion through a gate passageway into a mold cavity.

5. A method as claimed in claim 4 includes positioning a cord through the mold cavity prior to the molding step.

6. A method as claimed in claim 4 including the step of positioning a tape with a tape edge extending in the mold cavity prior to the molding so that the element is molded on the edge of the tape.

7. A method as claimed in claim 4 wherein only a portion of each plasticized portion is forced into the gate passageway, and the remaining portion forms a runner connecting the elements.

8. A method of manufacturing thermoplastic articles comprising the steps of advancing a continuous filament of thermoplastic material sequentially applying ultrasonic energy to successive unsevered portions of the thermoplastic filament to plasticize the successive portions of the filament, molding the plasticized portions of the thermoplastic portions in cavity means while still attached to said continuous filament, and separating the molded portions of the thermoplastic filament to form molded thermoplastic articles.

9. A method as claimed in claim 8 wherein the molding step includes forcing a portion of the plasticized thermoplastic into a cavity on one side of the strip, and forming a configuration on the opposite side of the strip simultaneously with the forcing, and wherein the separating step includes punching the article from the strip.

10. A method as claimed in claim 8 wherein the molding step includes forcing a portion of the plasticized portion through a gate passageway into a mold cavity from a channel forming a runner with the remaining portion and wherein the separating step includes the separating of the articles from the runner.

* * * * *